United States Patent
Shack et al.

(10) Patent No.: US 7,086,512 B2
(45) Date of Patent: Aug. 8, 2006

(54) HEADSET CABLE RETRACTION SYSTEM

(75) Inventors: Andrew Shack, Los Angeles, CA (US);
Natalie Driessen, Dana Point, CA (US);
Robert H. Palmer, Little Elm, TX (US); Charles J. Schmucker, Allen, TX (US); Nathan J. Tierney, Dallas, TX (US)

(73) Assignee: CAHP, LLC, Beverly Hills, CA (US)

( * ) Notice: Subject to any disclaimer, the term of this patent is extended or adjusted under 35 U.S.C. 154(b) by 0 days.

(21) Appl. No.: 10/960,111

(22) Filed: Oct. 6, 2004

(65) Prior Publication Data

US 2005/0072872 A1 Apr. 7, 2005

Related U.S. Application Data

(60) Provisional application No. 60/508,624, filed on Oct. 6, 2003.

(51) Int. Cl.
*H02G 11/02* (2006.01)
(52) U.S. Cl. .................. 191/12.4; 191/12 R; 242/379; 242/388.91
(58) Field of Classification Search ............. 191/12 R, 191/12.2 R, 12.4, 12.2 A; 242/388.91, 379, 242/385.1, 402; 455/575.2; 379/433.01; 206/320

See application file for complete search history.

(56) References Cited

U.S. PATENT DOCUMENTS

| | | | |
|---|---|---|---|
| 2,868,186 A * | 1/1959 | Schnacke .................. 123/185.4 |
| 3,434,676 A * | 3/1969 | Bogue ........................ 242/303 |
| 4,343,420 A * | 8/1982 | Scott ............................. 226/49 |
| 5,498,940 A * | 3/1996 | Kim et al. ....................... 318/6 |
| 5,511,120 A | 4/1996 | Hirata et al. |
| 5,684,883 A | 11/1997 | Chen |
| 5,724,667 A | 3/1998 | Furuno |
| 5,832,098 A | 11/1998 | Chen |
| 5,876,310 A * | 3/1999 | Mackey et al. ............... 482/74 |
| 6,082,656 A | 7/2000 | Thornton |
| 6,144,864 A | 11/2000 | Lands et al. |
| 6,199,674 B1 | 3/2001 | Liao |
| 6,285,757 B1 | 9/2001 | Carroll et al. |
| 6,301,487 B1 | 10/2001 | Nakamura |
| 6,371,398 B1 * | 4/2002 | Liao ......................... 242/378.1 |
| 6,375,109 B1 | 4/2002 | Liao |
| 6,434,249 B1 | 8/2002 | Wei |
| 6,438,248 B1 | 8/2002 | Kamimura et al. |
| 6,474,585 B1 | 11/2002 | Liao |
| 6,542,757 B1 | 4/2003 | Bae |
| 6,567,651 B1 | 5/2003 | Whitley |
| 6,578,683 B1 | 6/2003 | Burke et al. |
| 6,616,080 B1 | 9/2003 | Edwards et al. |
| 6,633,770 B1 | 10/2003 | Gitzinger et al. |

(Continued)

*Primary Examiner*—Frantz F. Jules
(74) *Attorney, Agent, or Firm*—Jeffer, Mangels, Butler & Marmaro, LLP

(57) ABSTRACT

A headset cable retraction system and device is described, the system including a housing, the housing having a cavity. In addition, the system includes a cord capable of transmitting an electrical signal, wherein a portion of the cord is contained in the cavity. The system further includes an earpiece attached to the cord; and, a retracting mechanism in the housing, the retracting mechanism including a drive wheel, a spring coupled to the drive wheel and a idler wheel, the cord being pressed between the drive wheel and the idler wheel; wherein when the cord is extracted from the cavity, the spring becomes tensioned. A method for using the system and device is also described.

18 Claims, 31 Drawing Sheets

U.S. PATENT DOCUMENTS

| | | |
|---|---|---|
| 6,658,130 B1 | 12/2003 | Huang |
| 6,679,448 B1 | 1/2004 | Carpenter et al. |
| 6,682,008 B1 | 1/2004 | Yeh |
| 6,698,560 B1 | 3/2004 | Reardon et al. |
| 6,702,077 B1 * | 3/2004 | Skowronski .......... 191/12.2 R |
| 6,712,304 B1 | 3/2004 | Taylor |
| 6,728,556 B1 | 4/2004 | Whitley |
| 6,731,956 B1 | 5/2004 | Hanna et al. |
| 6,763,111 B1 | 7/2004 | Liao |
| 2001/0035242 A1 * | 11/2001 | Hughs et al. ............ 150/154 |
| 2002/0023814 A1 | 2/2002 | Poutiatine |
| 2002/0137554 A1 | 9/2002 | Hanna et al. |
| 2003/0022632 A1 | 1/2003 | Bernhart |
| 2003/0040285 A1 | 2/2003 | Whitley |
| 2003/0060241 A1 | 3/2003 | Loprete |
| 2003/0096640 A1 | 5/2003 | Bae |
| 2003/0157973 A1 | 8/2003 | Yang |
| 2003/0165237 A1 | 9/2003 | Farr et al. |
| 2003/0192760 A1 | 10/2003 | Burke et al. |
| 2003/0224839 A1 | 12/2003 | Takahashi et al. |
| 2004/0013276 A1 | 1/2004 | Ellis et al. |
| 2004/0013279 A1 | 1/2004 | Takeda |
| 2004/0048639 A1 | 3/2004 | Obolo |
| 2004/0077382 A1 | 4/2004 | Verity |
| 2004/0077390 A1 | 4/2004 | Liao |
| 2004/0097273 A1 | 5/2004 | Chiang |

* cited by examiner

HEADSET CABLE RETRACTION SYSTEM

This application claims the benefit of U.S. Provisional Application No.: APPLICATION NO. 60/508,624 FILING DATE Oct. 6, 2003.

FIELD OF THE INVENTION

The present invention relates generally to cable retention systems, and more particularly, to a headset cable retraction system and device.

BACKGROUND OF THE INVENTION

Cellular phones have become indispensable in our daily lives—being utilized by everyone worldwide and existing in immeasurable numbers due to their practicality, increasing cost effectiveness and convenience of use. However, the use of cellular phones is not without inherent risks. For example, many individuals make and receive cellular calls while driving. This action necessarily requires the use of at least one hand to operate and/or hold the cellular phone, substantially increasing the risk of an automobile accident causing possible injury to oneself and others. In addition, overexposure to cellular radiation has become a recognized phenomenon warranting consumer concern.

Thus, a need has arisen for a means by which a cellular phone can be utilized in a "hands-free" manner. Hands-free is understood to mean the ability to transmit and receive audio signals through a cellular phone without the user having to manually hold the cellular phone. One development for cellular phones to address this issue is an integrated speakerphone function. The speakerphone function of cellular phones has become widely used, especially during walking, working or driving a car. The speakerphone function provides the safety of the user in using the phone, especially during driving. However, even with the speakerphone functions, there have been some limitations.

One of the main limitations with the speakerphone function is poor audio performance. In a conventional speakerphone implementation, the main components include a phone cradle, a loudspeaker to broadcast audio signals from the phone and a microphone to receive audio signals (i.e. signal containing the user's voice). The poor audio performance results from the distance between the user's mouth and the microphone that allows ambient sounds to blend with the user's voice and causes noise. Even with current noise cancellation technology, the ambient noise interference creates poor audio performance. Additionally, the use of the loudspeaker increases ambient noise due to additional feedback that is created in closed areas, particularly in automobiles where phones are commonly used. Even outside of a closed environment, ambient noise is a problem as open spaces create opportunities for many other different types of sounds to affect audio performance. Further, privacy concerns do not always allow the user to utilize the speakerphone function.

To overcome problems associated with speakerphones, headsets have been used in conjunction with phones to provide better quality audio reception and transmission. These headsets may be used in conjunction with cradles that hold the phone in place in an automobile or on a user. The headsets are typically connected to the phone or the cradle with a cord that transmits and receives the audio signals between the phone and the user's ear and mouth. Unfortunately, the headset and cord combination create a unique set of problems that bring further limitations.

One such problem is the placement of the headset and phone when not in use. If the phone is not in a cradle while it is an automobile, the headset and phone may move around the interior and create a dangerous situation for one attempting to answer a call or otherwise use the phone and headset while driving. The phone and headset may not remain together in the automobile and therefore locating the phone and headset may create a distraction while driving. Another problem is that the cord becomes a distraction to a driver since the cord may become tangled or looped around other devices in the automobile. If this happens, problems will occur when a call arrives and the user tries to answer the incoming call when the headset cord becomes tangled. Yet another problem is the inconvenience caused by the length of the cable of the headset. Often, because the length of the cable must be long enough to reach from the waist of the user to their ear, the cable must be at least two or three feet in length. When not in use, this length of cable becomes a nuisance, often catching on protrusions and tearing the phone out of the user's pocket or the earpiece out of the user's ear. Thus, with current headsets, considerable wrapping and tangling occurs with the cables. Many times an individual will lose or break the earpiece because there is no proper storage while it is not in use.

Although existing cable storage systems exist, they are often bulky and prone to entanglement of the cable during use. For example, one approach is the utilization of a reel around which the cable is wound when the cable is not in use. The spool includes a spring that is tensioned when the user pulls out the cable. Thereafter, the cable is rewound as the tension of the spring is released. However, in many cases, when the cable is being returned to the spool, it is not properly rewound and jams the mechanism.

Accordingly, there is a need to overcome the issues noted above.

SUMMARY OF THE PREFERRED EMBODIMENTS

The present invention provides a headset cable retraction system and device useful for a variety type of audio devices, including mobile phones, audio players and cordless telephones, as well as video devices that have an audio output.

In one preferred embodiment, the headset cable retraction system includes a housing, the housing having a cavity; a cord capable of transmitting an electrical signal, wherein a portion of the cord is contained in the cavity; an earpiece attached to the cord; and a retracting mechanism in the housing, the retracting mechanism including a drive wheel, a spring coupled to the drive wheel and a idler wheel, the cord being pressed between the drive wheel and the idler wheel; wherein when the cord is extracted from the cavity, the spring becomes tensioned.

In another embodiment, the hand-held headset cable retraction device includes a housing having an internal cavity with a cable storage section; a cable capable of transmitting an electrical signal therethrough, wherein at least a portion of the cable is disposed within the cable storage section; an earpiece attached to one end of the cable and accessible from the housing; and a cable retraction mechanism disposed within the housing. The cable retraction mechanism includes a drive wheel rotatably disposed within the housing and positioned upstream of the cable storage section; an idler wheel rotatably disposed within the housing and positioned adjacent and diametrically opposed to the drive wheel; and a spring coupled to one of the drive wheel and idler wheel to bias the rotational movement of the one of the drive wheel and idler wheel; wherein the cord is interposed between and contacts both the drive wheel and the idler wheel, and the cord is retractably extracted from the housing by pulling it away from the housing, causing the spring to be tensioned.

In one embodiment of use, a method for removing and replacing a cable from a cable retraction device includes the steps of (1) retracting a cable from an internal cavity of a housing comprising a drive wheel and an idler wheel rotatably disposed therein, wherein the cable is interposed between and contacts only a portion of both the drive wheel and the idler wheel, and wherein a portion of the cable stored within the device is positioned in a section of the internal cavity separate from the drive wheel and idler wheel; and (2) locking the device into a first position when the cable is extracted to maintain the cable in an extracted position.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The present invention is a headset cable retraction system and device that, in a preferred embodiment, is adapted for use for cellular, communication, and cordless telephone devices. However, the headset cable retraction system may also be used with other audio media applications such as portable audio electronic devices, including CD players, MP3 players, AM/FM devices and the like. Further, the system may also be used with video playback or other multimedia devices, e.g., electronic book readers, DVD players, digital video players, that have audio output. For purposes of the following description, the use of the headset cable retraction system will be assumed for cellular and cordless telephone devices.

In one embodiment, the present invention allows users to attach or affix the headset cable retraction system in a semi-permanent fashion to a cellular or cordless telephone for a user-friendlier earpiece device for hands-free communications. The headset cable retraction system attempts to eliminate current problems that exist with speaker/earpiece devices which do not retract and are not semi-permanently/permanently affixed to the phone; tangling, losing, kinking, misplacing or breaking of the cable or speaker/earpiece itself. In addition, the headset cable retraction system attempts to provide a mechanism that is more resistant to being jammed by a retracting cable than a spool mechanism. In the present invention, the cord for the headset will be retractable within a housing to avoid complications that exist with loose cables.

Figure 1:
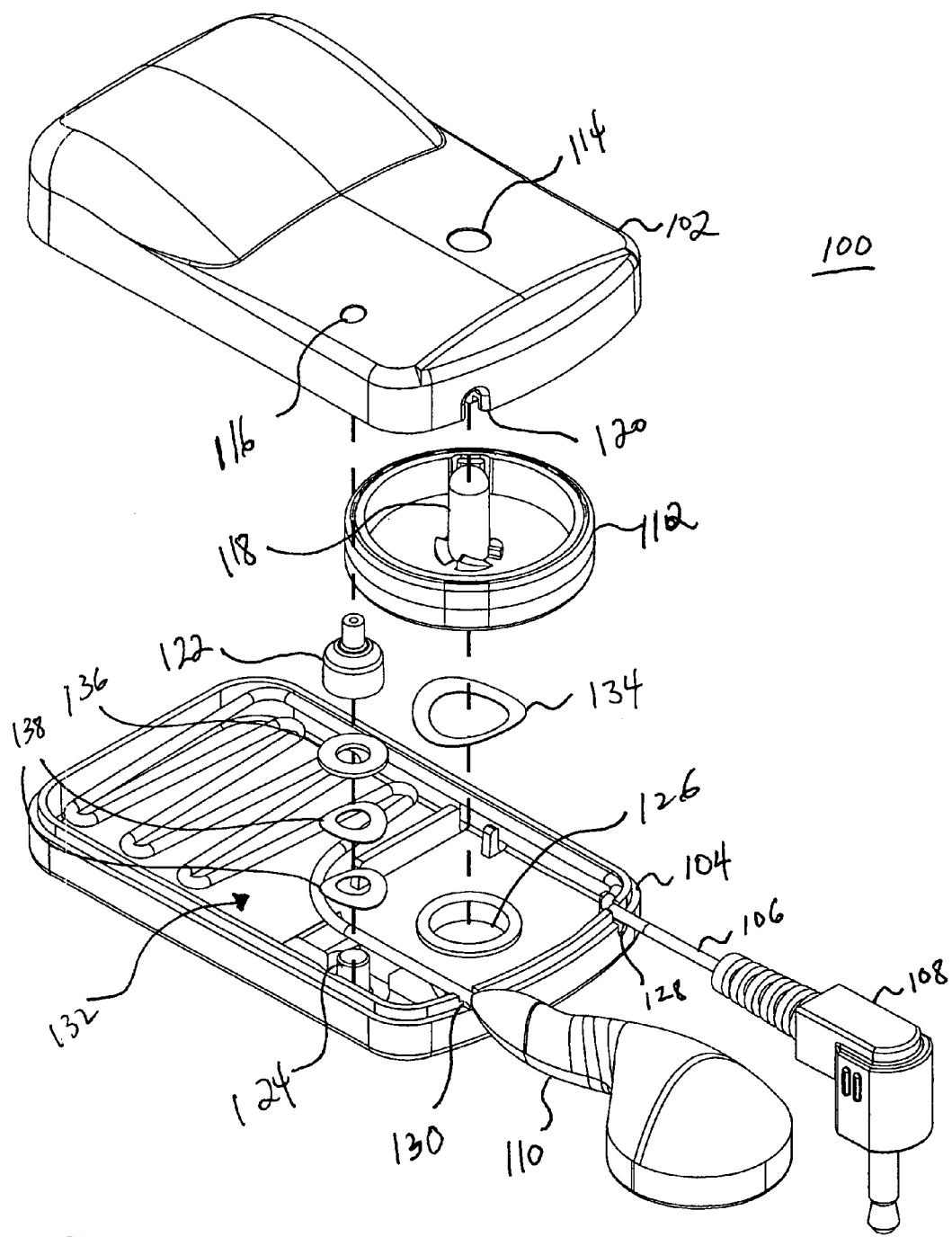
FIG. 1 is an exploded perspective view of a headset cable retraction system configured in accordance to a preferred embodiment of the present invention.
Figure 2:
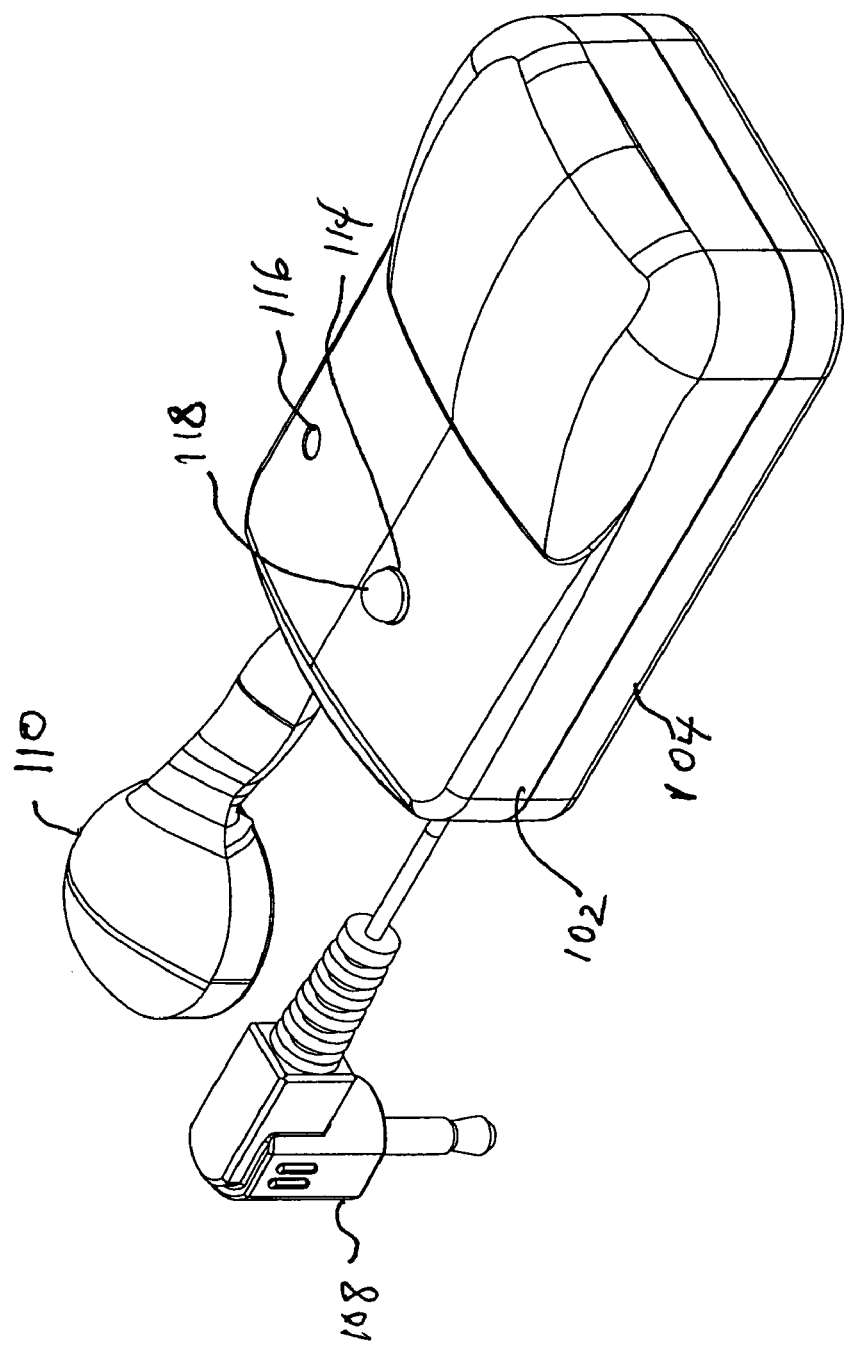
FIG. 2 is a perspective view of the headset cable retraction system of FIG. 1.
Figure 3:
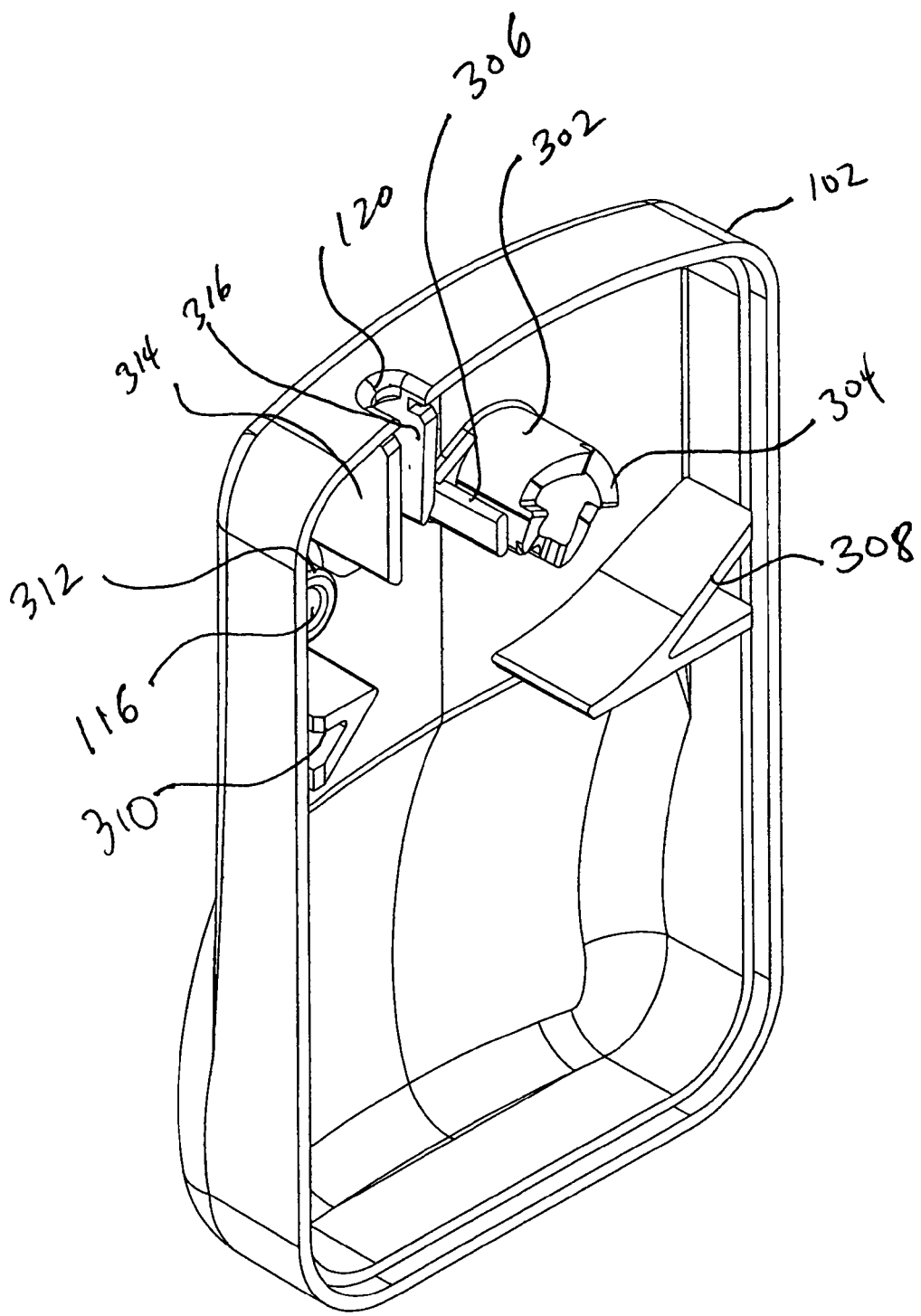
FIG. 3 is a perspective view of an interior of a top housing of the headset cable retraction system of FIG. 1.
Figure 4:
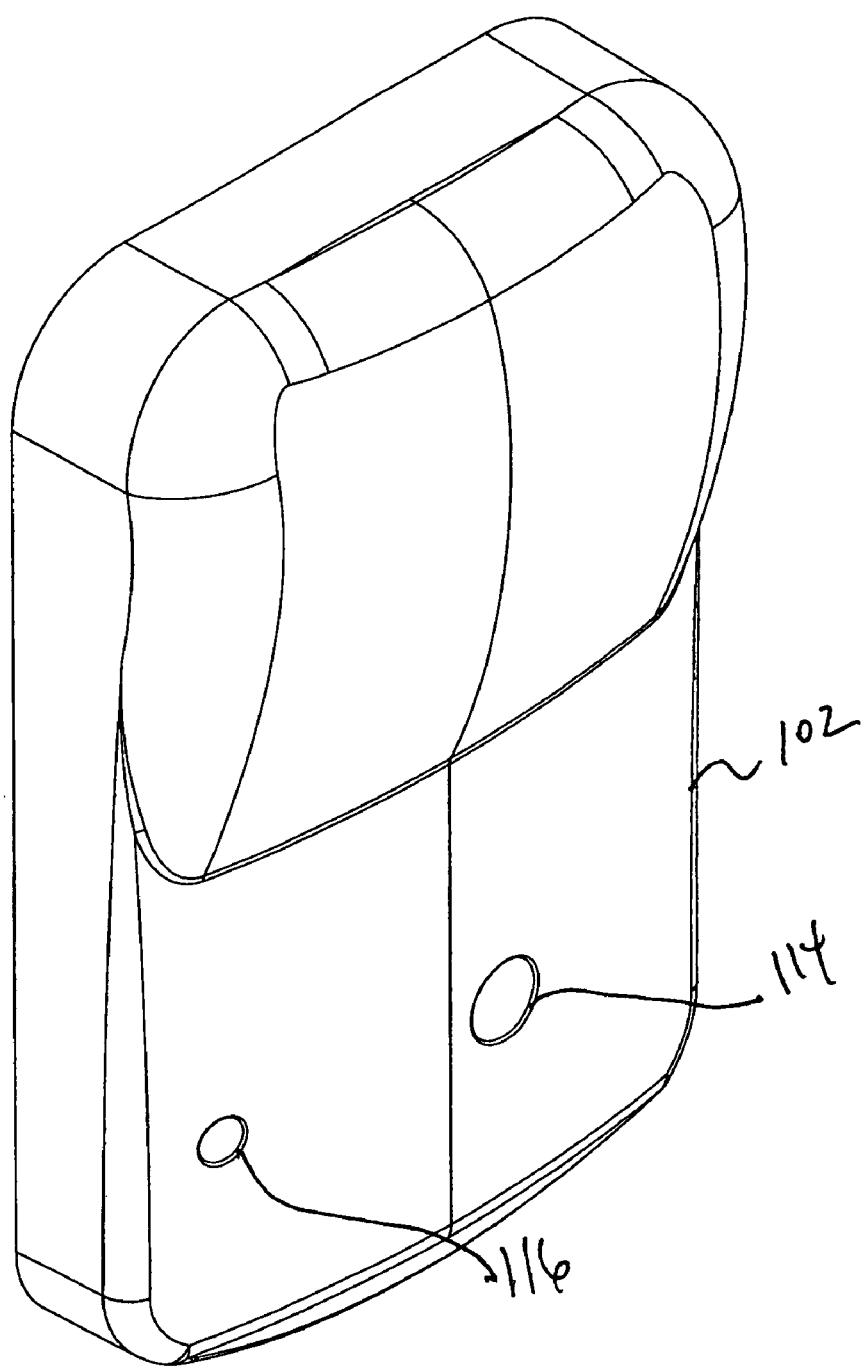
FIG. 4 is a perspective view of an exterior of the top housing of the headset cable retraction system of FIG. 1.
Figure 5:
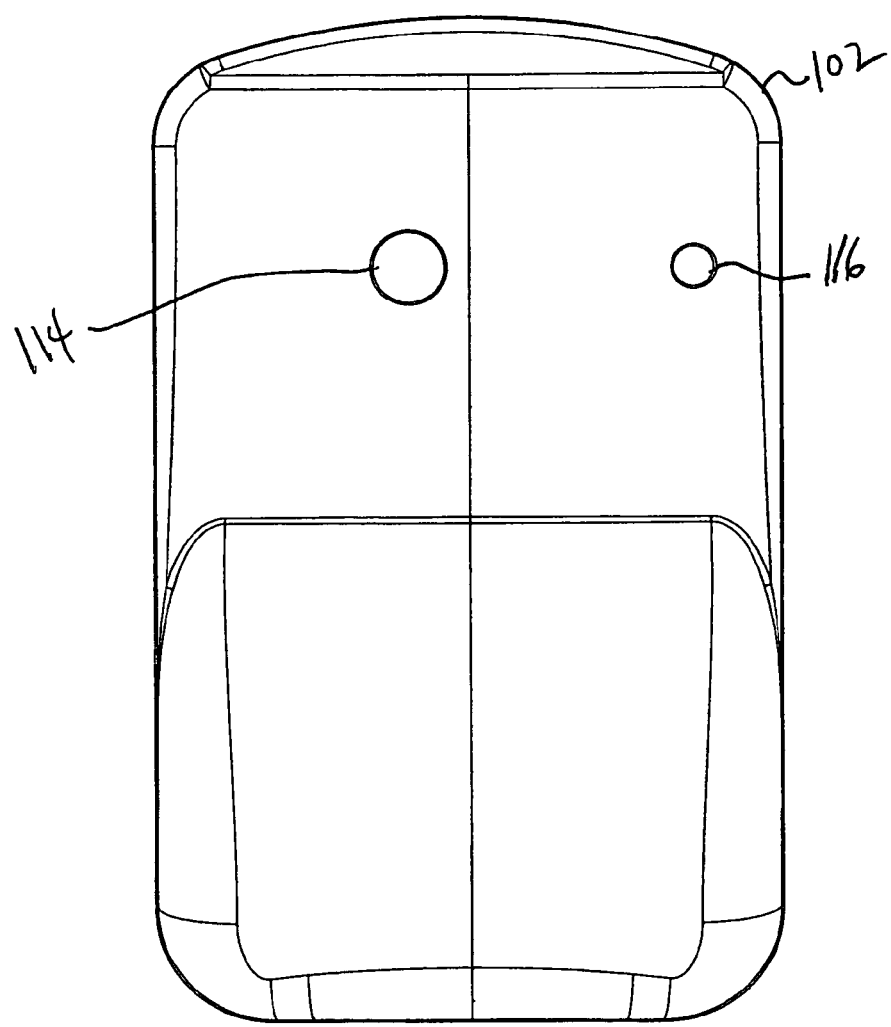
FIG. 5 is a plan view of the exterior of the top housing of the headset cable retraction system of FIG. 1.
Figure 6:
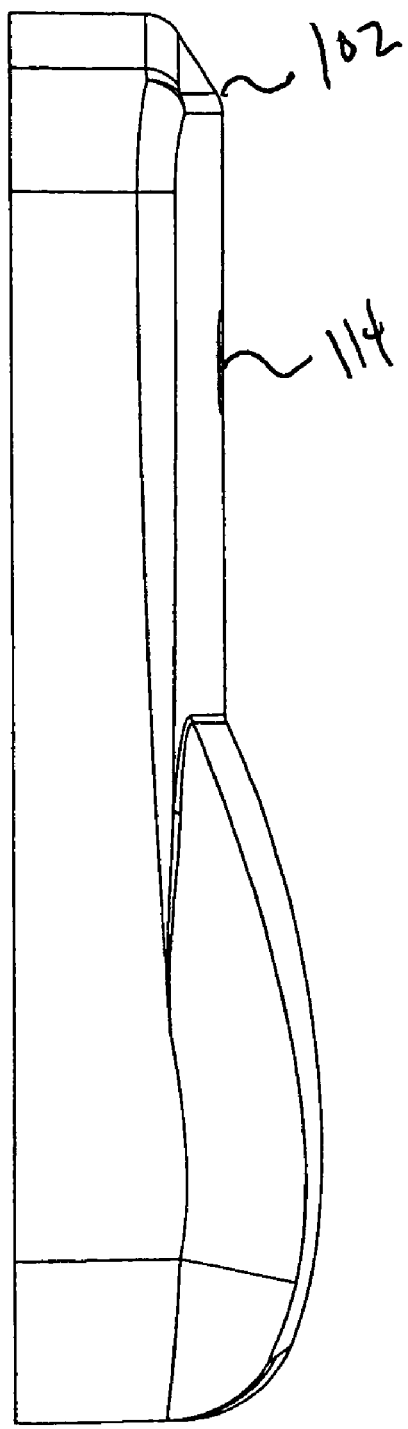
FIG. 6 is a left-side elevation view of the top housing of the headset cable retraction system of FIG. 1.
Figure 7:
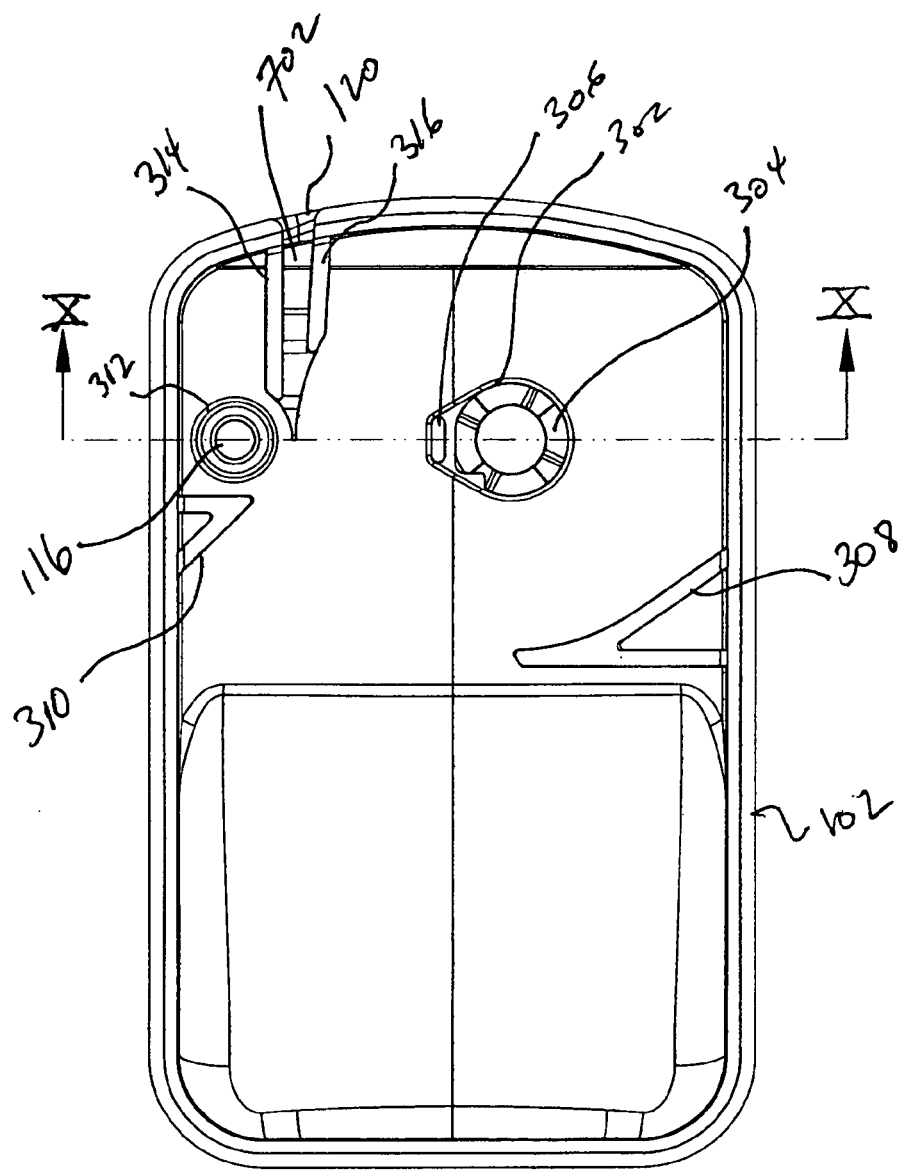
FIG. 7 is a plan view of an interior of the top housing of the headset cable retraction system of FIG. 1.
Figure 8:
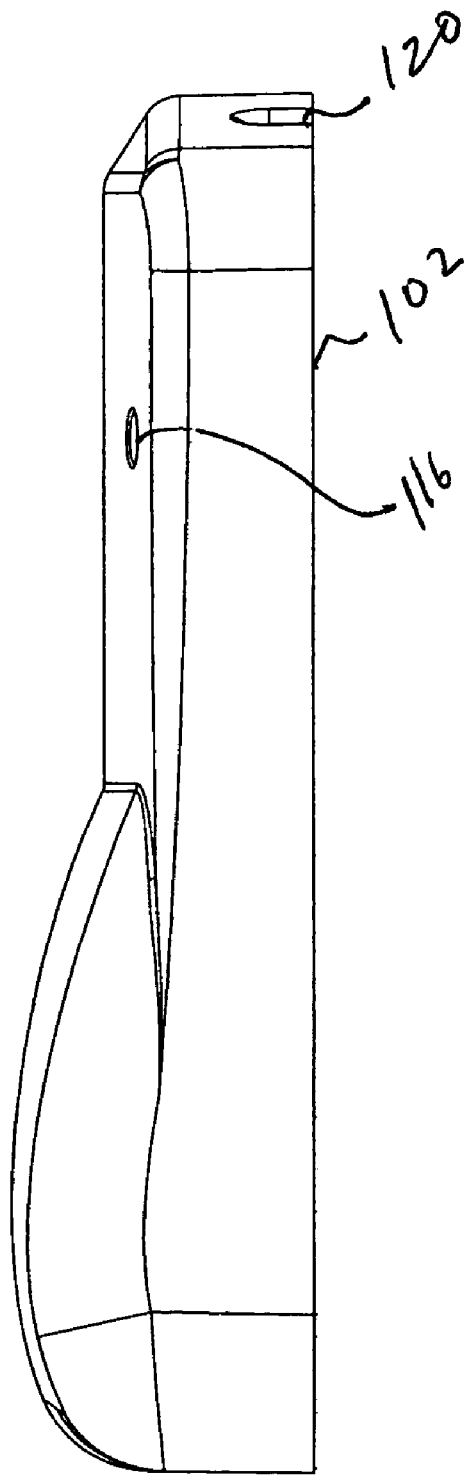
FIG. 8 is a right-side elevation view of the top housing of the headset cable retraction system of FIG. 1.
Figure 9:
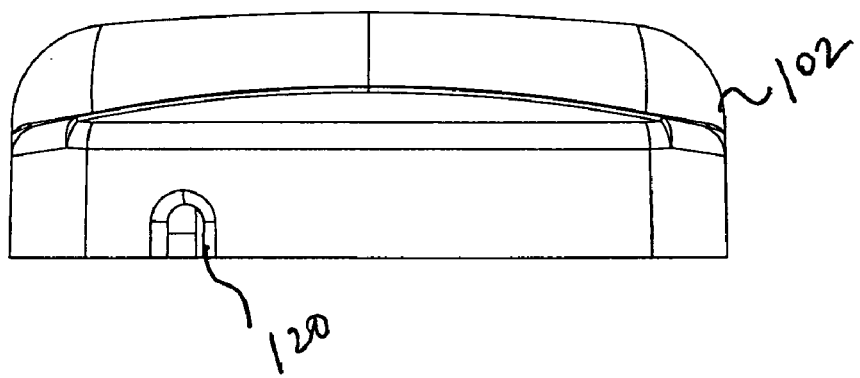
FIG. 9 is a front-side elevation view of the top housing of the headset cable retraction system of FIG. 1.
Figure 10:
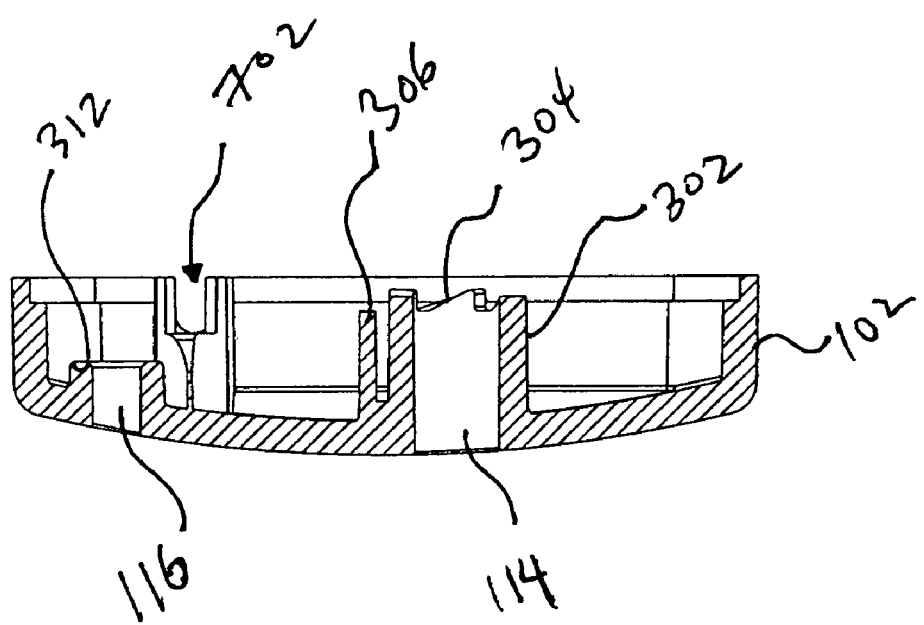
FIG. 10 is a cross-sectional view of the top housing of the headset cable retraction system of FIG. 1, taken along line X—X of FIG. 7.
Figure 11:
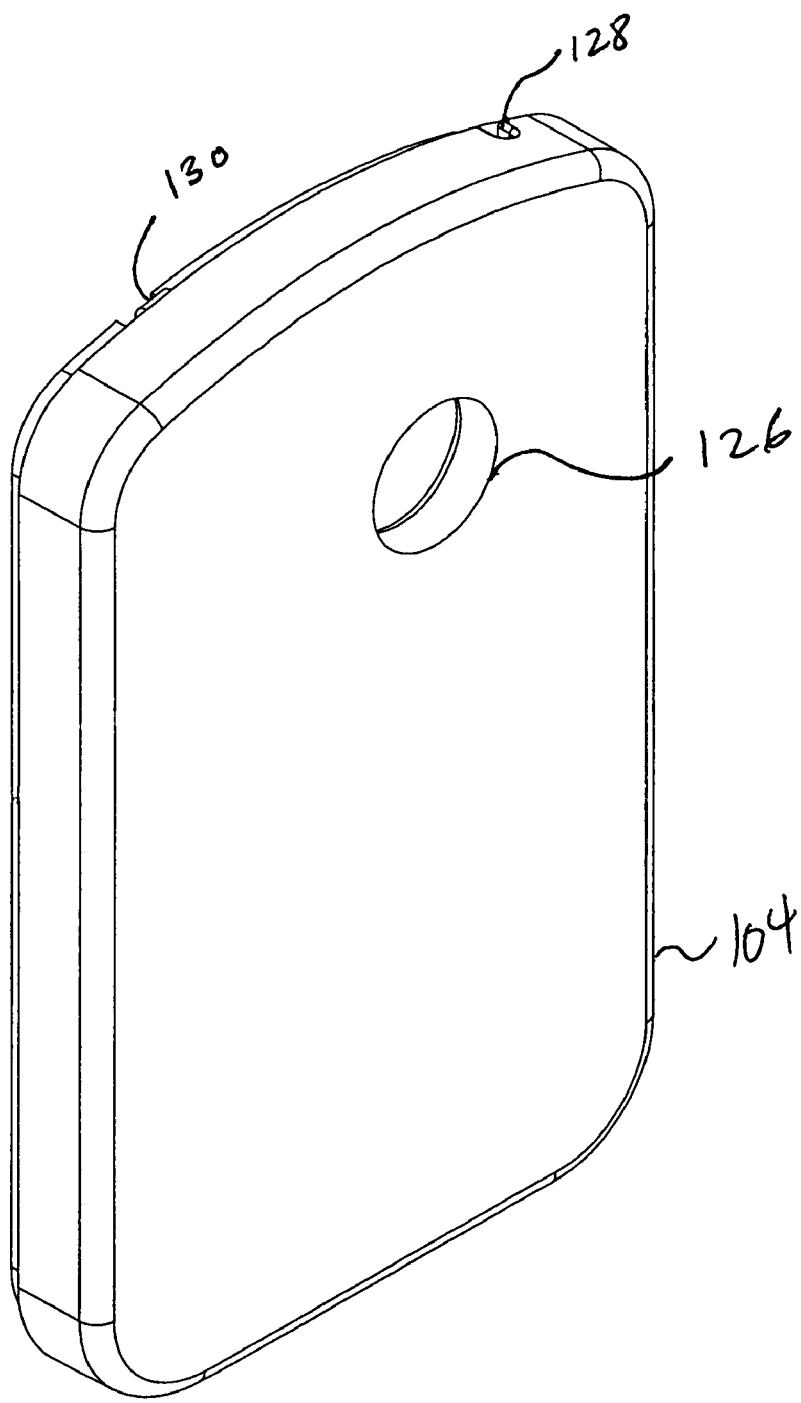
FIG. 11 is a perspective view of an exterior of a bottom housing of the headset cable retraction system of FIG. 1.
Figure 12:
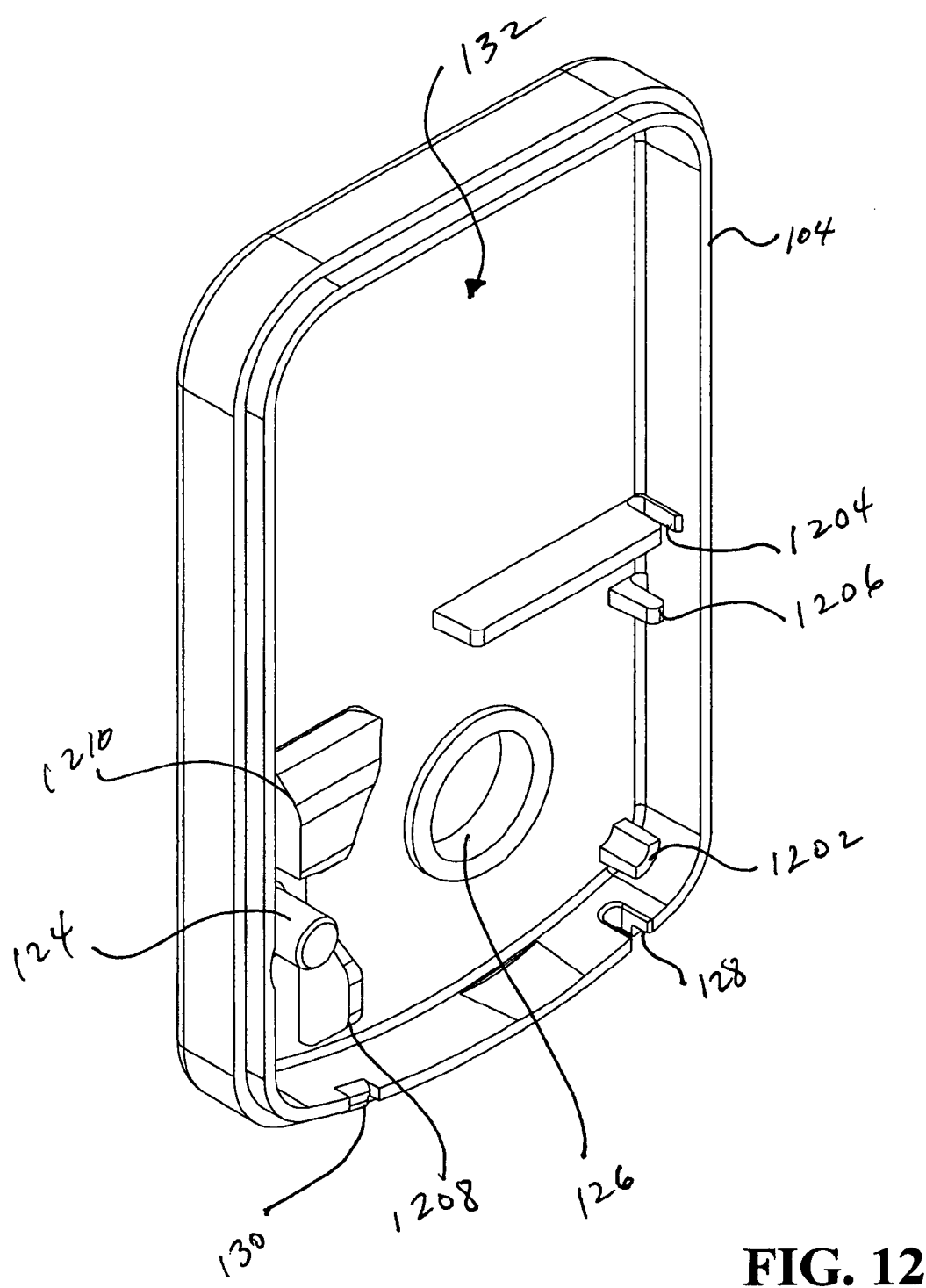
FIG. 12 is a perspective view of an interior of the bottom housing of the headset cable retraction system of FIG. 1.
Figure 13:
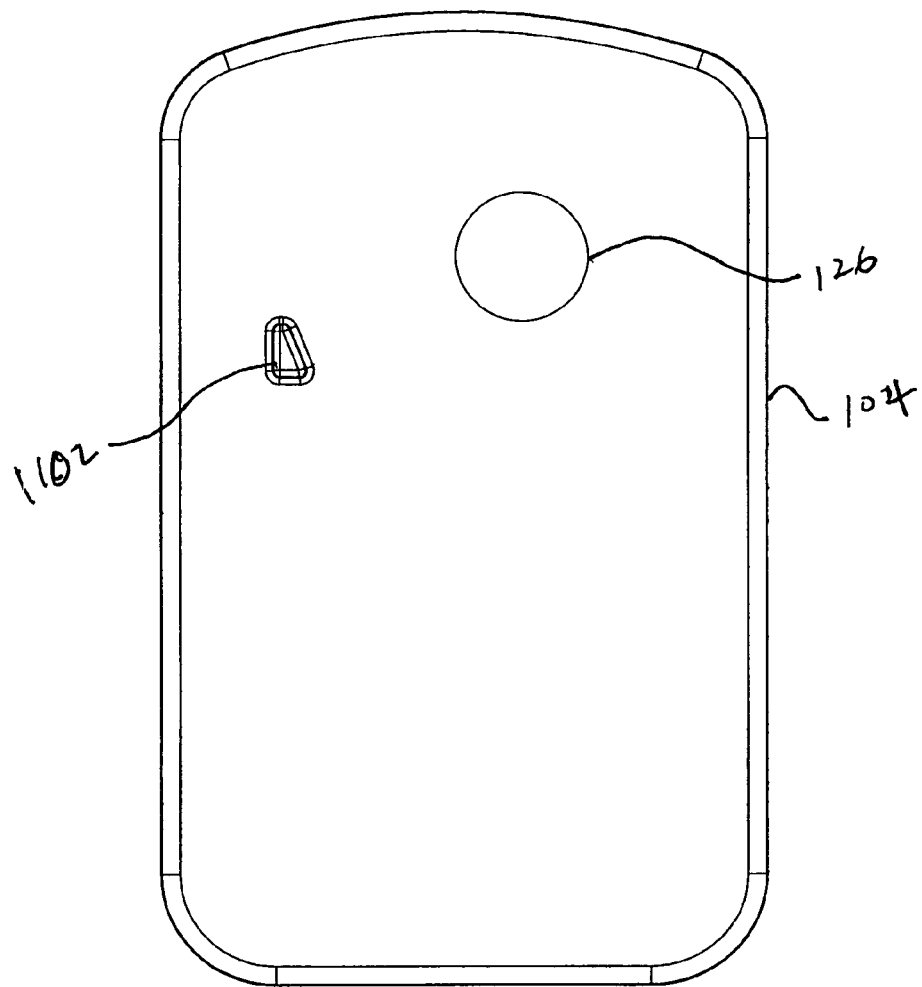
FIG. 13 is a plan view of the exterior of the bottom housing of the headset cable retraction system of FIG. 1.
Figure 14:
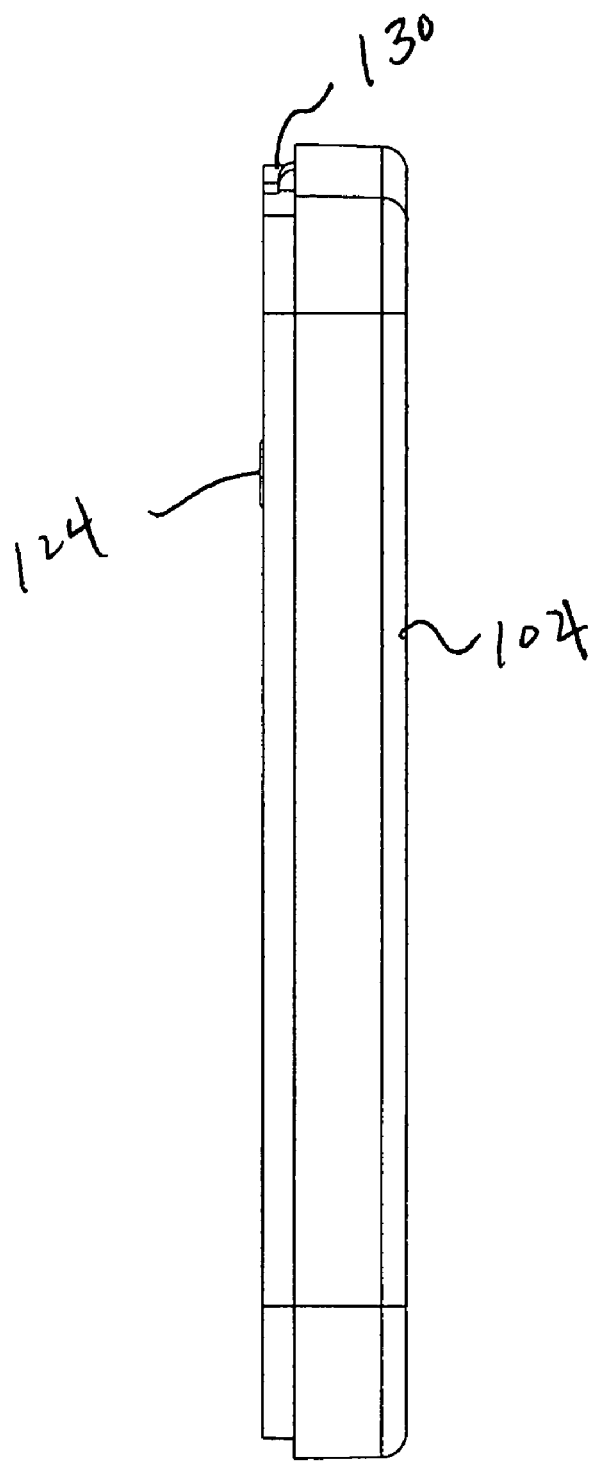
FIG. 14 is a right-side elevation view of the bottom housing of the headset cable retraction system of FIG. 1.
Figure 15:
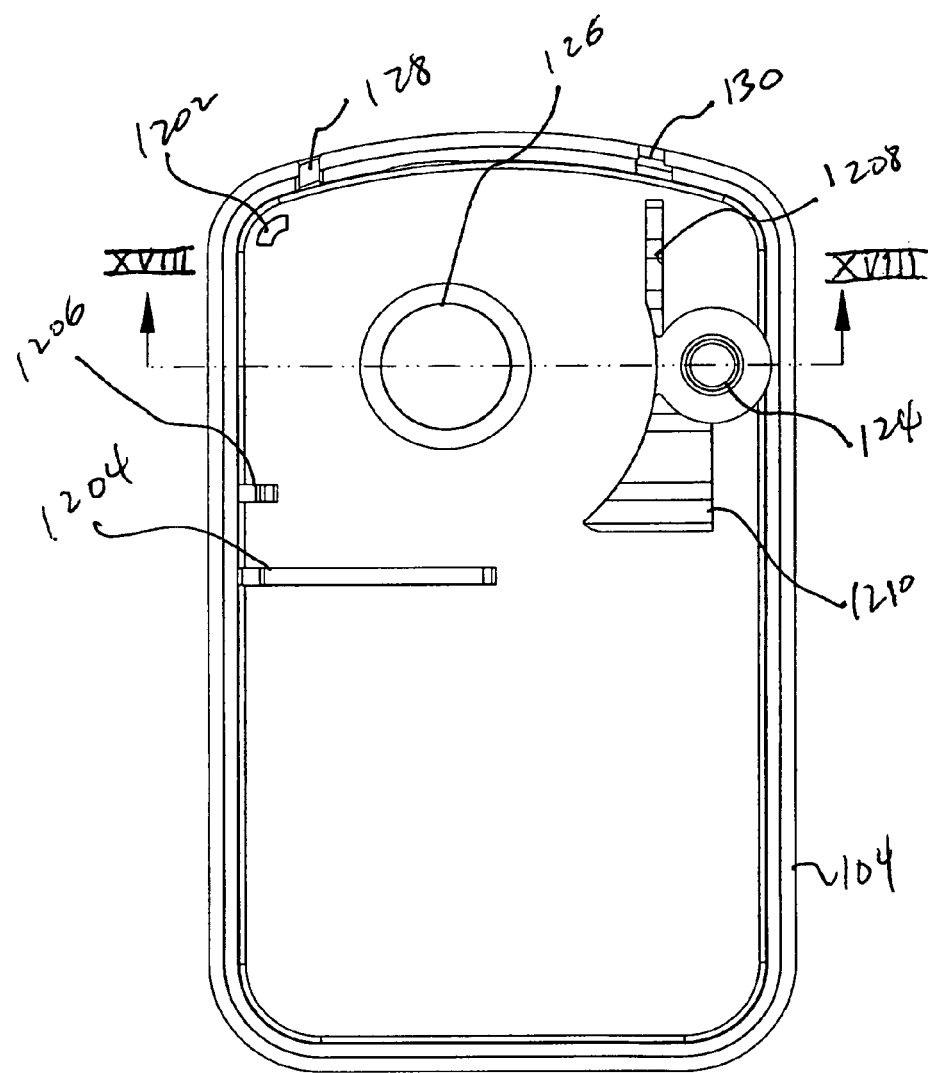
FIG. 15 is a plan view of an interior of the bottom housing of the headset cable retraction system of FIG. 1.
Figure 16:
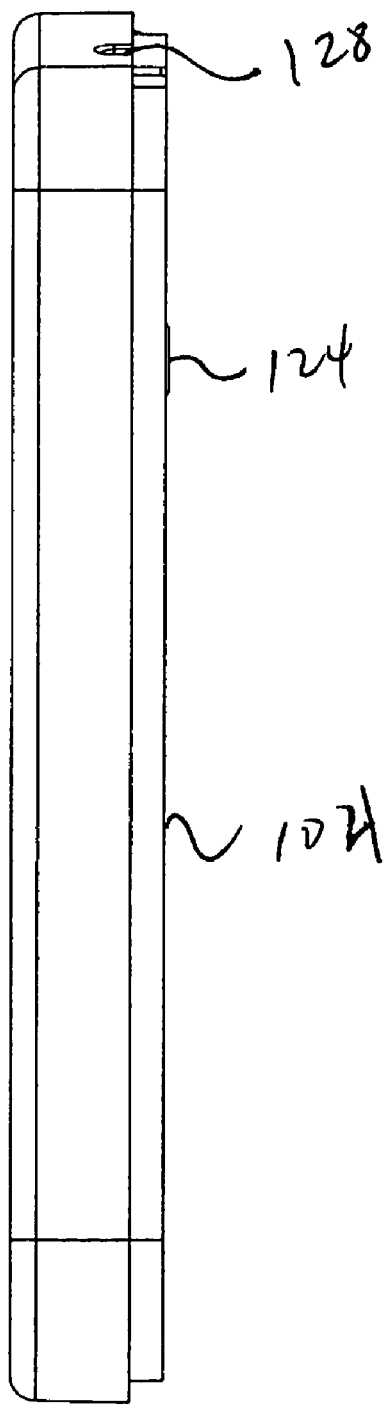
FIG. 16 is a left-side elevation view of the bottom housing of the headset cable retraction system of FIG. 1.
Figure 17:
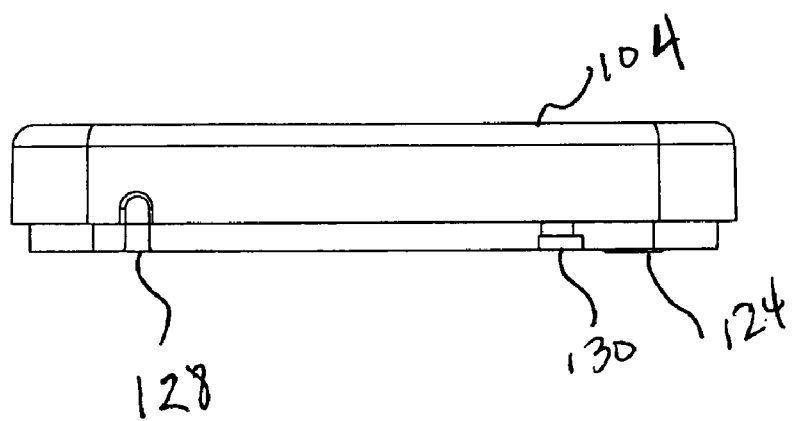
FIG. 17 is a front-side elevation view of the bottom housing of the headset cable retraction system of FIG. 1.
Figure 18:
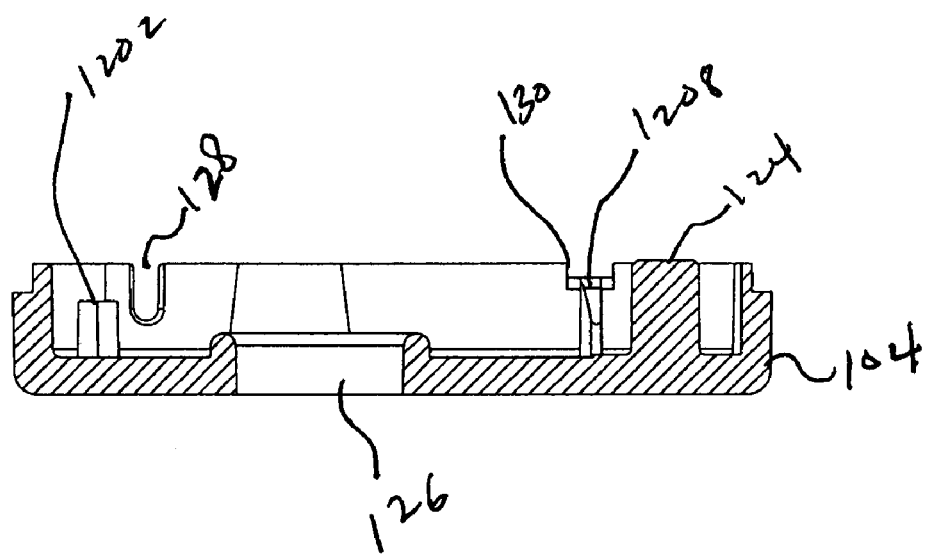
FIG. 18 is a cross-sectional view of the bottom housing of the headset cable retraction system of FIG. 1, taken along line XVIII—XVIII of FIG. 15.
Figure 19:
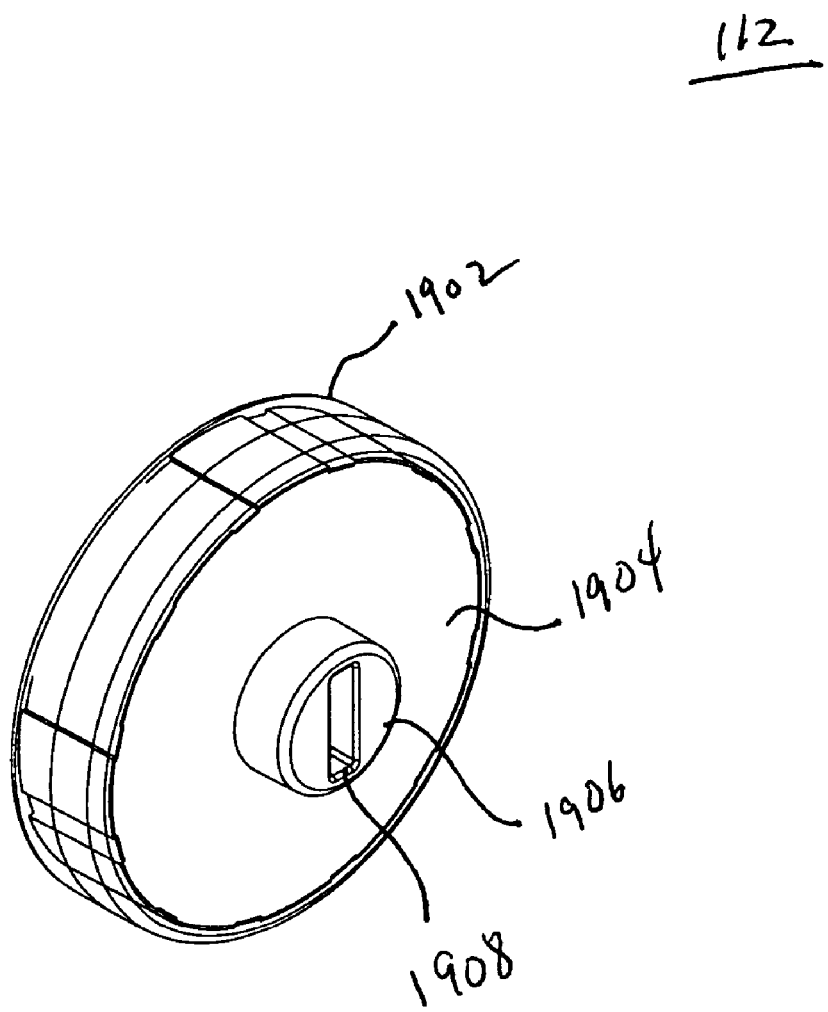
FIG. 19 is a perspective view of a drive wheel of the headset cable retraction system of FIG. 1.
Figure 31:
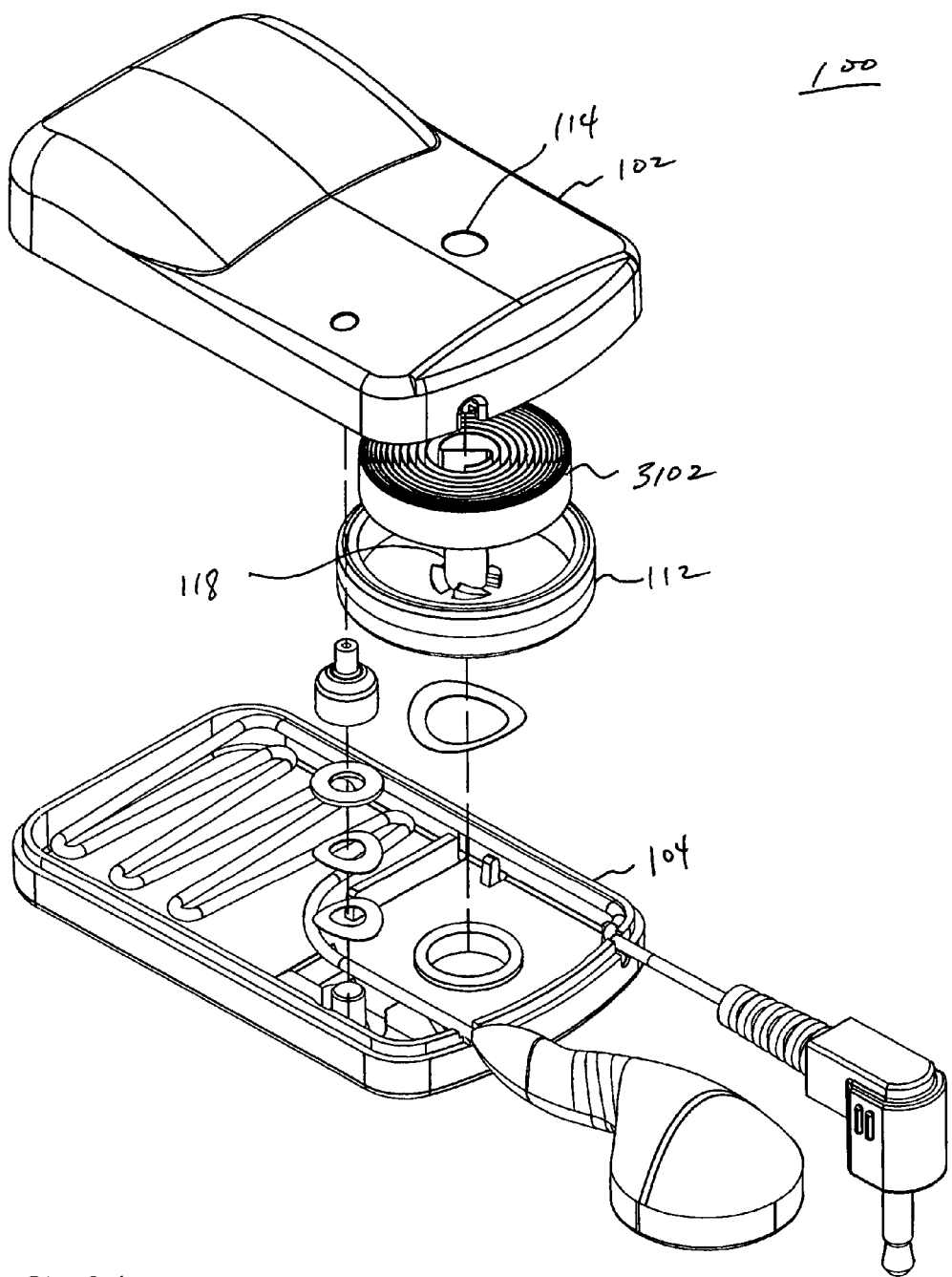
FIG. 31 is an exploded perspective view of the headset cable retraction system of FIG. 1, including a spring.

FIG. 1 and FIG. 2 illustrate a headset cable retraction system 100 configured in accordance with one embodiment of the present invention. Headset cable retraction system 100 includes a top housing 102 and a bottom housing 104 that may be mounted to the back of a cell phone (not shown). Headset cable retraction system 100 includes a drive wheel 112 that, along with an idler (slave) wheel 122, coils and retracts a cable 106 for an earpiece 110 into a storage cavity 132 formed between top housing 102 and bottom housing 104. As opposed to using a spool to store the headset cable, the use of drive wheel 112 to pull and retract headset cable 106 into storage cavity 132 through friction reduces the wrapping and tangling that occurs with the use of spools to store the headset cable and also reduces any tendency for the headset cable to be damaged through improper storage. A spring 3102 (see FIG. 31) is used as part of the tension mechanism for retracting headset cable 106

In one embodiment, earpiece 110 includes both a microphone as well as a miniature speaker such as that typically used for earpieces. Thus, the piece that will go into the ear will contain both the listening (i.e., speaker) and speaking (i.e., microphone) device in one. This will allow the coiling of the earpiece to be neat and only a small device (i.e., earpiece 110) will be not wound and kept within storage cavity 132. In another embodiment, earpiece 110 only includes a miniature speaker.

Earpiece 110 is electrically connected to an audio device such as a cellular phone (not shown) through the use of a plug 108 that extends from a connector opening 128 in bottom housing 104. Thus, the connection to the phone will be with the already existing earpiece connector on the phone. In one embodiment, the length of headset cable 106 attached to plug 108 that extends from connector opening 128 is fixed as headset cable 106 is retained in bottom housing 104. In another embodiment, the portion of headset cable 106 that extends from connector opening 128 is coiled. With this detachable connection to the phone, one part of headset cable 106 that is permanently fastened to headset cable retraction system 100, headset cable 106 cannot become completely uncoiled. The detachable connection offered by plug 108 may consist of any suitable plug and socket arrangement, depending on the requirements of the phone to which the headset is adapted. Plug 108 may also be adapted where the system is used for other types of devices, such as audio or music players. With such a detachable connection, the complete chassis may be removed and replaced as often as desired, without endangering the protection afforded by the casing.

Further, the electronic interconnect of headset cable retraction system 100 to the cellular or cordless telephone device does not require a swivel joint because headset cable 106 does not revolve around a spool or reel to stow the cable when it is retracted. Storage systems using reels require a swivel interconnect for the electronic headset cord to rotate around a spool or reel. By eliminating the requirement for a swivel electronic interconnection, component, assembly and overall product cost and reliability can be improved.

Figure 20:
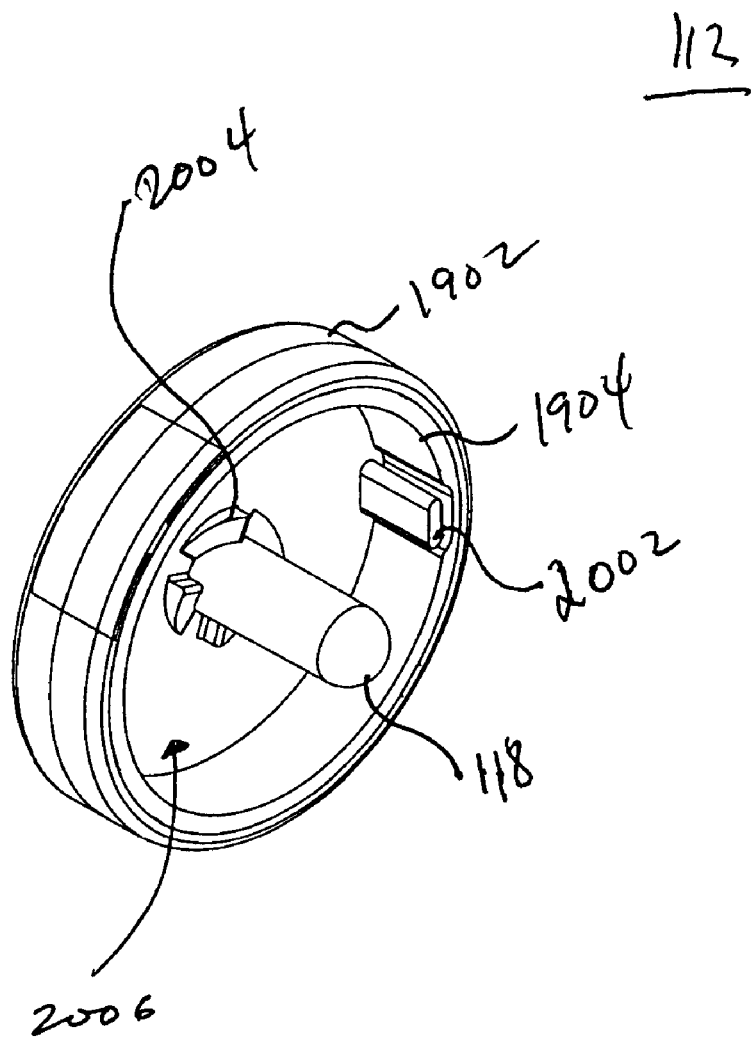
FIG. 20 is a perspective view of an opposite side of the drive wheel of the headset cable retraction system of FIG. 1.
Figure 21:
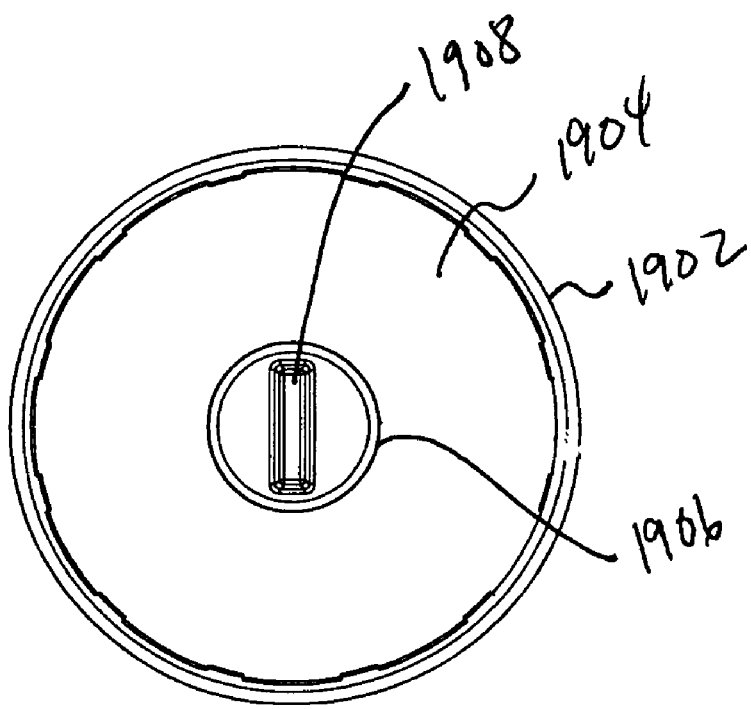
FIG. 21 is a plan view of the drive wheel of the headset cable retraction system of FIG. 1.
Figure 22:
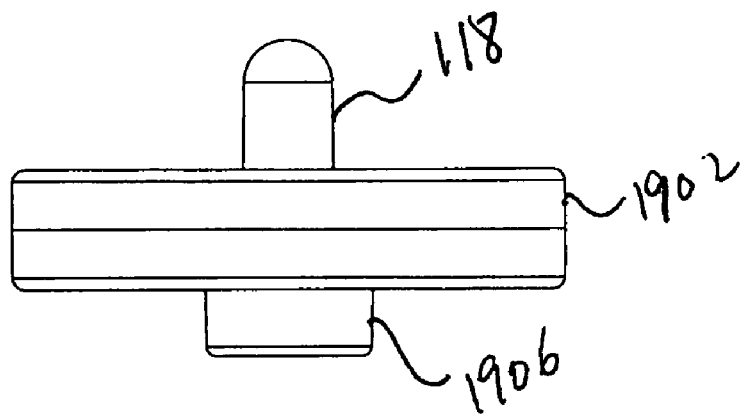
FIG. 22 is a side elevation view of the drive wheel of the headset cable retraction system of FIG. 1.
Figure 23:
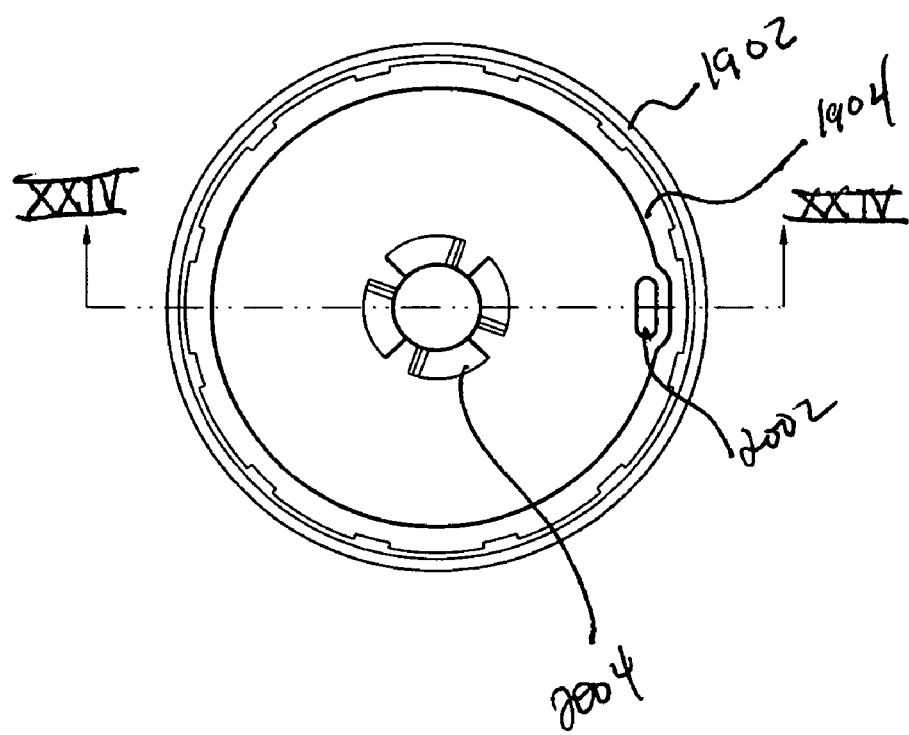
FIG. 23 is a plan view of the opposite side of the drive wheel of the headset cable retraction system of FIG. 1.
Figure 24:
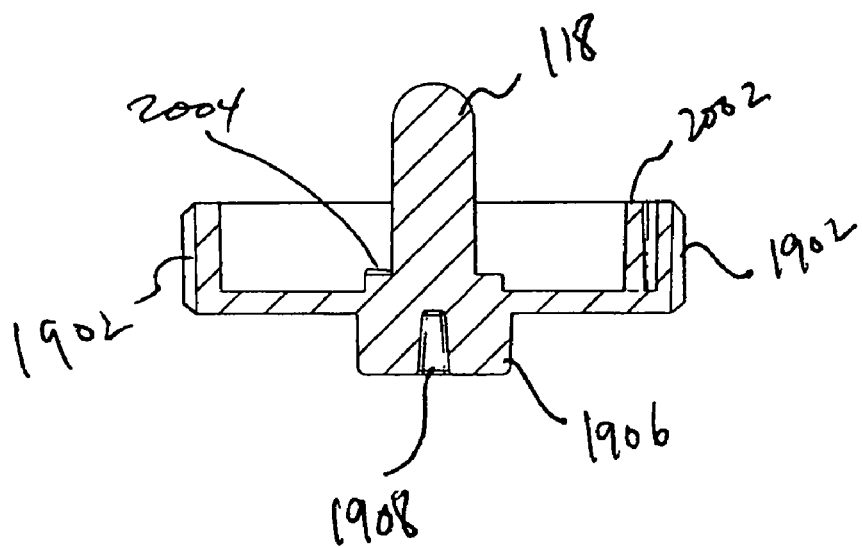
FIG. 24 is a cross-sectional view of the drive wheel of the headset cable retraction system of FIG. 1, taken along line XXIV—XXIV of FIG. 23.
Figure 25:
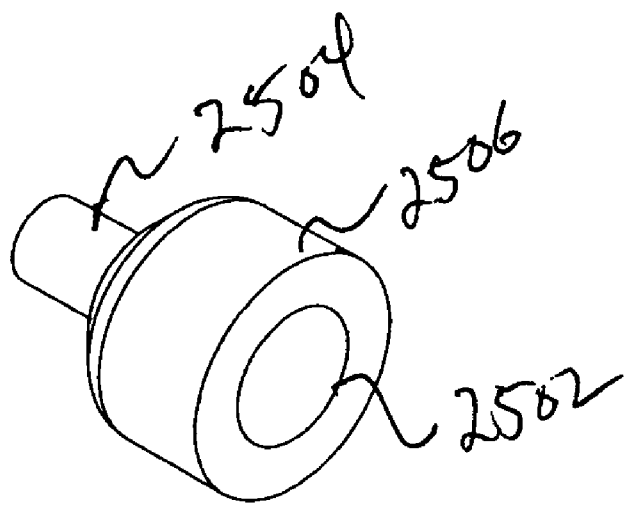
FIG. 25 is a perspective view of an idler wheel of the headset cable retraction system of FIG. 1.
Figure 26:
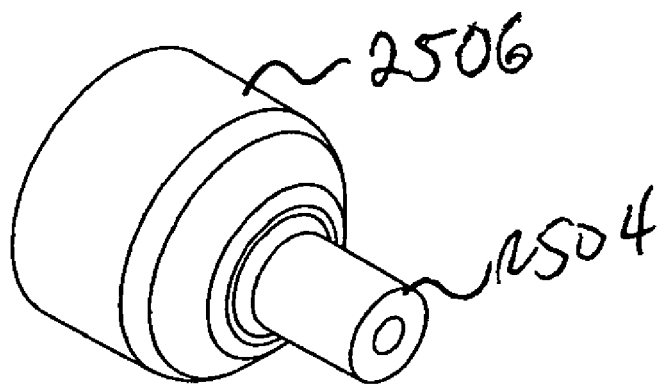
FIG. 26 is a perspective view of an opposite side of the idler wheel of the headset cable retraction system of FIG. 1.
Figure 27:
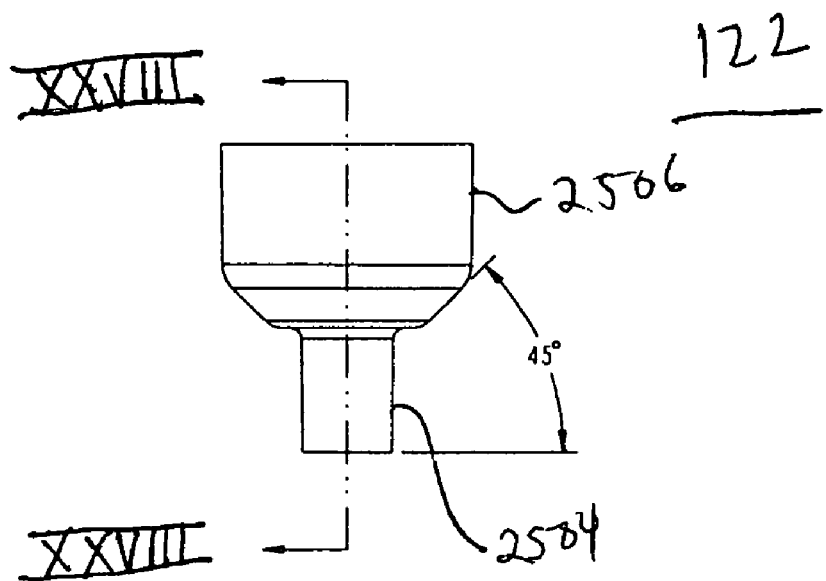
FIG. 27 is a side elevation view of the idler wheel of the headset cable retraction system of FIG. 1.
Figure 28:
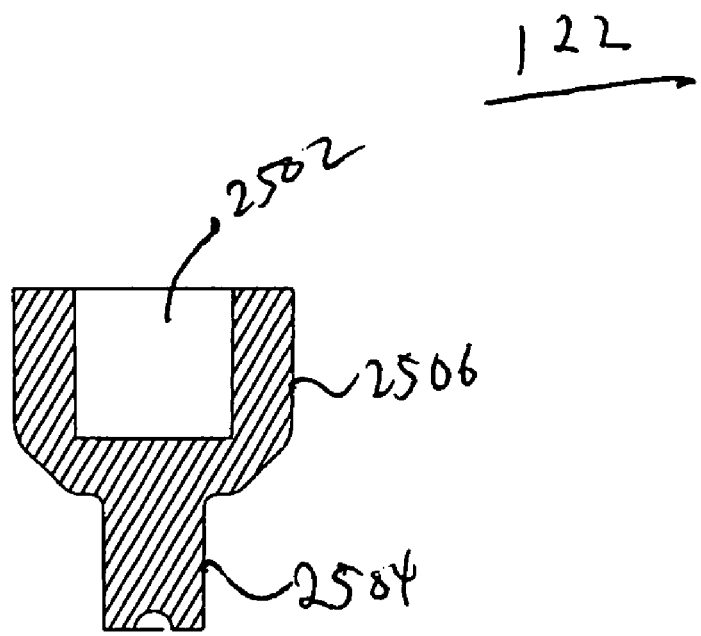
FIG. 28 is a cross-sectional view of the idler wheel of the headset cable retraction system of FIG. 1, taken along line XXVIII—XXVIII of FIG. 27.
Figure 29:
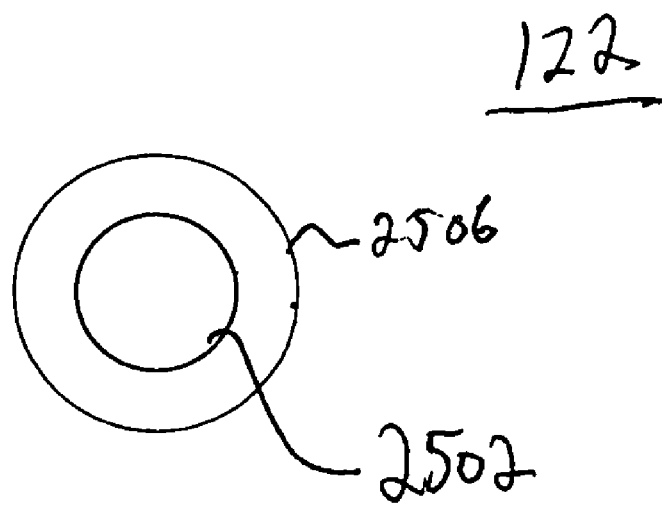
FIG. 29 is a plan view of the idler wheel of the headset cable retraction system of FIG. 1.
Figure 30:
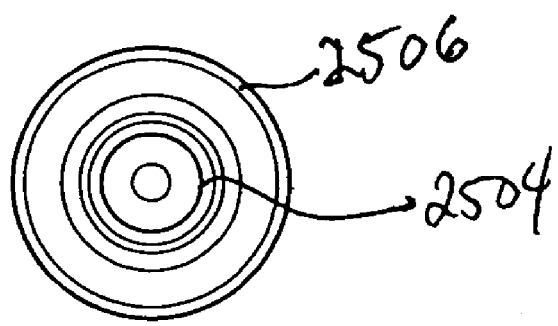
FIG. 30 is a plan view of the opposite side of the idler wheel of the headset cable retraction system of FIG. 1.

Also referring to FIG. 3 through FIG. 10, top housing 102 includes a headset cable opening 120 through which headset cable 106 may be deployed. Top housing 102 also includes an opening 114 and an opening 116 through which a spring post 118 on drive wheel 112 and a portion of idler wheel 122 respectively extend and are retained. A cylindrical ridge 312 is used to hold idler wheel 122. A channel 702 defined by a pair of retaining walls 314 and 316 are used to guide headset cable 106 as it is extracted from the housing. Further, an idler wheel wall 310 and a drive wheel wall 308 guides headset cable 106 as it is being retracted into the housing. A locking post 302 in top housing 102 includes a plurality of ridges 304 to interact with a reciprocal plurality of ridges 2004 on drive wheel 112 shown in FIG. 20, FIG. 23 and FIG. 24.

Referring to FIG. 11 through FIG. 18, bottom housing 104 contains an opening 126, in which the bottom of drive wheel 112 is retained, and an idler wheel retention post 124 over which idler wheel 122 is placed. Bottom housing 104 also includes a set of cable guides 1202, 1206 and 1204 for holding the portion of headset cable 106 that is proximal to plug 108. Cable guide 1204 also includes a wall portion for retaining the retracted portions of headset cable 106. Bottom housing 104 further includes a second set of cable guides 1208 and 1210 for guiding the extraction and retraction of headset cable 106. A headset cable dispensing opening 130 allows headset cable 106 to exit the housing.

FIG. 19 through FIG. 24 illustrate drive wheel 112 in further detail. Drive wheel 112 includes a drive wheel body 1904 having a rubberized coating 1902 and a protrusion 1906 that fits into opening 126 in bottom housing 104. Drive wheel body 1904 also includes a slot 1908 for manual tensioning of spring 3102. A cavity 2006 of drive wheel body 1904 is used to store spring 3102, and a drive wheel spring retention stop 2002 to prevent the rotational movement of spring 3102, allowing spring 3102 to be tensioned.

FIG. 25 through FIG. 30 illustrate idler wheel 122 in further detail. Idler wheel 122 includes a protrusion 2504 extending from a body 2506, which is chamfered, as well as a recess 2052 that fits over idler wheel retention post 124. Referring again to FIG. 1, in one embodiment, a drive wheel wave washer (wave spring, or spring washer) 134 is used to bias drive wheel 134, while a pair of idler wheel wave washers 138 is used to bias idler wheel 122 through a idler wheel flat washer 136. In other embodiments, other types of springs may be used to bias drive wheel 134 and idler wheel 122. The wave washers are used as a spring to re-coil the buttons. Idler wheel flat washer 136 allows idler wheel 122 and drive wheel 112 to freely rotate without the wave washers digging into the housing.

Idler wheel 122 may be used to correct a "mis-feed." For example, if headset cable 106 slips when being retracted and remains extends beyond the desired length after spring 3102 is completely relaxed, the user can correct the extended cord length by depressing idler wheel 122 through opening 116 to release headset cable 106 from the gripping rubber and "re-charge" spring 3102 with slot 1908 on the opposing side of the housing for drive wheel 112. The chamfered shape of idler wheel 122 allows headset cable 106 to freely rest while spring 3102 is being re-tensioned. When idler wheel 122 is depressed (in the event of a mis-feed), pair of idler wheel wave washers 138 acts as a spring to re-position idler wheel 122 back into position to accurately compress headset cable 106 to drive wheel 112. Under normal use, idler wheel 122 needs to rotate freely and thus, idler wheel flat washer 136 is there to isolate the wave washer from the freely rotating idler wheel 122. Drive wheel 112 will only turn when headset cord 106 is being gripped by rubberized coating 1902 on drive wheel 112 passes through the housing and compresses spring 3102 or when spring post 118 on drive wheel 112 is depressed disengaging the ratcheting features in the housing/drive wheel 112 to release the tension in spring 3102 and gripping headset cord 105 and pushing it back into the housing.

In one embodiment, to use headset cable retraction system 100, headset cable 106 is pulled from the housing. As a user pulls out headset cable 106, drive wheel 112 is turned and spring 3102 is tensioned (i.e., wound). Specifically, as headset cord 106 is pulled from the housing, the friction pulleys (i.e., rubberized coated wheels of drive wheel 112 and idler wheel 122) are turned, applying a ratcheting load to the connected spring system and thereby charging the friction pulleys to be prepared for re-coil upon release of a button or slide mechanism. The other end of spring 3102 is restrained from moving by a top housing spring retention stop 306, which acts like drive wheel spring retention stop 2002. In one embodiment, the spring system is released and headset cable retraction system 100 re-coils headset cable 106 when the user presses on spring post 118, thereby disengaging plurality of ridges 304 from reciprocal plurality of ridges 2004 and allowing spring 3102 to release its tension. Upon release of the spring system, the friction pulleys re-coil, pulling headset cable 106 back into headset cable cavity 132 for storage.

In one embodiment, the length of headset cable 106 is between three (3) and four (4) feet. However, other lengths may be utilized depending on the required deployment of headset cable retraction system 100. Thus, the characteristics of spring 1302 must be selected to allow for the amount of extraction of headset cable 106 to occur without over-tensioning spring 1302.

The use of the retractable headset system of the present invention enables the user to never lose or misplace earpiece 110. This will also promote an extra safety benefit because the headset will always be in the same location. Therefore, while driving a vehicle one would not have to take their eyes off the road in order to look for earpiece 110. The user would also not need to detangle any wires in order to use the headset while driving. Now the user could simply redeploy the headset directly from the phone itself. After use of the headset is complete, the cable retraction system would simply retract the headset back into the housing mounted on the back of the phone.

As described above, headset cable retraction system 100 is applied to a phone. However, it should be noted that the system is equally applicable to audio or music players, desktop computers, laptops, or other devices.

The embodiments described above are exemplary embodiments of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A headset cable retraction system, comprising:
    a housing, the housing including a cavity;
    a cord capable of transmitting an electrical signal, wherein a portion of the cord is removably contained in the cavity;
    an earpiece attached to the cord;
    a retracting mechanism in the housing, the retracting mechanism including a drive wheel, a wave washer biasing the drive wheel, a spring coupled to the drive wheel, and a idler wheel, the cord being pressed between the drive wheel and the idler wheel; wherein when the cord is extracted from the cavity, the spring becomes tensioned; and,
    a stop mechanism displaced in the housing and operatively connected to the retracting mechanism for holding the cord at selected positions when the cord is extracted from the housing, wherein the stop mechanism includes a plurality of ridges in the drive wheel and a matching plurality of ridges in the housing, at least one of the plurality of ridges engaging one of the matching plurality of ridges to prevent release of the tensioned spring.

2. The system of claim 1, wherein the retracting mechanism includes a wave washer biasing the idler wheel.

3. The system of claim 2, wherein the retracting mechanism includes a flat washer between the wave washer and the idler wheel.

4. The system of claim 1, wherein the drive wheel includes a rubberized surface.

5. The system of claim 1, wherein the cord connector includes a plug for connecting to a receptacle on a mobile phone.

6. The system of claim 1, wherein the earpiece includes a speaker.

7. The system of claim 1, wherein the earpiece includes a speaker and a microphone.

8. The system of claim 1, wherein a side of the housing is configured to mate with a side of a mobile phone.

9. A phone having a retractable cord, comprising:
    a phone circuit contained in a housing, the housing including a cavity;
    a cord capable of transmitting an electrical signal, wherein a portion of the cord is removably contained in the cavity;
    an earpiece attached to the cord and coupled to the phone circuit;
    a retracting mechanism in the housing, the retracting mechanism including a drive wheel, a wave washer biasing the drive wheel, a spring coupled to the drive wheel, and a idler wheel, the cord being pressed between the drive wheel and the idler wheel; wherein when the cord is extracted from the cavity, the spring becomes tensioned; and,
    a stop mechanism displaced in the housing and operatively connected to the retracting mechanism for holding the cord at selected positions when the cord is extracted from the housing, wherein the stop mechanism includes a plurality of ridges in the drive wheel and a matching plurality of ridges in the housing, at least one of the plurality of ridges engaging one of the matching plurality of ridges to prevent release of the tensioned spring.

10. The phone of claim 9, wherein the retracting mechanism includes a wave washer biasing the idler wheel.

11. The phone of claim 10, wherein the retracting mechanism includes a flat washer between the wave washer and the idler wheel.

12. The phone of claim 9, wherein the drive wheel includes a rubberized surface.

13. The phone of claim 9, wherein the cord connector includes a plug for connecting to a receptacle on a mobile phone.

14. The phone of claim 9, wherein the earpiece includes a speaker.

15. The phone of claim 9, wherein the earpiece includes a speaker and a microphone.

16. A method for removing and replacing a cable from a cable retraction device, the method comprising the steps of:
    retracting a cable from an internal cavity of a housing comprising a drive wheel having a plurality of ridges, a wave washer biasing the drive wheel, and an idler wheel rotatably disposed therein, the housing also comprising a matching plurality of ridges, at least one of the plurality of ridges engaging one of the matching plurality of ridges to lock the device, wherein the cable is interposed between and contacts only a portion of both the drive wheel and the idler wheel, and wherein a portion of the cable stored within the device is positioned in a section of the internal cavity separate from the drive wheel and idler wheel; and, locking the device into a first position when the cable is extracted to maintain the cable in an extracted position.

17. The method of claim 16, further comprising the step of unlocking the device into a second position for retracting the cable into the housing.

18. The method of claim 16, wherein the step of retracting the cable includes tensioning a spring coupled to one of the drive wheel and the idler wheel.

* * * * *